(12) United States Patent
Ponte et al.

(10) Patent No.: US 10,655,271 B1
(45) Date of Patent: May 19, 2020

(54) SYSTEMS AND METHODS FOR ARTICLE INSPECTIONS

(71) Applicant: CaaStle, Inc., New York, NY (US)

(72) Inventors: Ericka Ponte, Delaware, OH (US); Kashif Noor, New York, NY (US); Phillip Hoffman, Woodmere, NY (US); Andrew Demaray, Chicago, IL (US)

(73) Assignee: CAASTLE, INC., New York, NY (US)

( * ) Notice: Subject to any disclaimer, the term of this patent is extended or adjusted under 35 U.S.C. 154(b) by 0 days.

(21) Appl. No.: 16/671,337

(22) Filed: Nov. 1, 2019

Related U.S. Application Data

(63) Continuation of application No. 16/281,902, filed on Feb. 21, 2019, now Pat. No. 10,494,759.

(51) Int. Cl.
| | | |
|---|---|---|
| *G08B 21/18* | (2006.01) | |
| *G01N 33/00* | (2006.01) | |
| *A41D 27/00* | (2006.01) | |
| *D06F 95/00* | (2006.01) | |
| *G06Q 10/08* | (2012.01) | |
| *G06F 3/041* | (2006.01) | |
| *G06F 3/0484* | (2013.01) | |

(52) U.S. Cl.
CPC .......... *D06F 95/008* (2013.01); *G06F 3/0412* (2013.01); *G06F 3/04842* (2013.01); *G06Q 10/0875* (2013.01)

(58) Field of Classification Search
CPC ....... A41B 2400/36; A47G 25/14; D06L 1/16; D06L 1/22
See application file for complete search history.

(56) References Cited

U.S. PATENT DOCUMENTS

| | | | | |
|---|---|---|---|---|
| 2004/0120571 | A1* | 6/2004 | Duvdevani | G06K 9/00973 382/149 |
| 2005/0043857 | A1* | 2/2005 | Van Fleet | G06Q 10/06 700/286 |
| 2005/0267704 | A1* | 12/2005 | Huntley | G06Q 10/00 702/83 |
| 2005/0280536 | A1* | 12/2005 | Hamilton | G06Q 10/087 340/572.1 |
| 2008/0156705 | A1* | 7/2008 | Markman | B07C 5/34 209/552 |
| 2009/0013311 | A1* | 1/2009 | Ooba | G05B 23/0213 717/127 |
| 2009/0248549 | A1* | 10/2009 | Breslau | G06Q 10/087 705/29 |
| 2010/0005003 | A1* | 1/2010 | Cassaday | B07C 5/3412 705/23 |
| 2011/0232004 | A1* | 9/2011 | Meine | C11D 1/835 8/137 |
| 2013/0199696 | A1* | 8/2013 | Schneider | A61F 13/49011 156/64 |

(Continued)

*Primary Examiner* — Mohammad K Islam
(74) *Attorney, Agent, or Firm* — Bookoff McAndrews, PLLC

(57) ABSTRACT

A method of using an inspection processor includes receiving one or more articles at an inspection station, and identifying, by the inspection processor, one of the articles by reading a unique identifier associated with the one of the articles. The method also includes inspecting the article based on at least one quality criterion, and updating an article tracking system based on the result of the inspection and the identifier.

20 Claims, 10 Drawing Sheets

(56) References Cited

U.S. PATENT DOCUMENTS

| | | | | |
|---|---|---|---|---|
| 2015/0018979 A1* | 1/2015 | Tomii | G06Q 50/10 | 700/19 |
| 2015/0186773 A1* | 7/2015 | Weill | G06Q 50/01 | 706/13 |
| 2015/0192774 A1* | 7/2015 | Watanabe | B65G 1/1375 | 345/8 |
| 2015/0301004 A1* | 10/2015 | Carney | G08B 21/12 | 73/31.01 |
| 2015/0379366 A1* | 12/2015 | Nomura | G06Q 50/28 | 382/203 |
| 2015/0382085 A1* | 12/2015 | Lawrie-Fussey | G06K 19/0717 | 340/870.07 |
| 2016/0073697 A1* | 3/2016 | Nezat | A41B 17/00 | 2/113 |
| 2016/0202951 A1* | 7/2016 | Pike | G06F 3/04842 | 715/728 |
| 2016/0275775 A1* | 9/2016 | Glasgow | G08B 21/182 | |
| 2017/0004567 A1* | 1/2017 | Dutt | G06Q 30/0643 | |
| 2017/0323264 A1* | 11/2017 | Subramanian | G06Q 10/30 | |
| 2018/0153234 A1* | 6/2018 | Nam | A41D 15/00 | |
| 2018/0357756 A1* | 12/2018 | Kawka | A61F 13/15772 | |
| 2019/0050427 A1* | 2/2019 | Wiesel | G06N 20/00 | |
| 2019/0096135 A1* | 3/2019 | Dal Mutto | G06T 17/20 | |

* cited by examiner

SYSTEMS AND METHODS FOR ARTICLE INSPECTIONS

CROSS-REFERENCE TO RELATED APPLICATION

This application is a continuation of and claims the benefit of priority to pending U.S. application Ser. No. 16/281,902, filed Feb. 21, 2019, which is incorporated herein by reference in its entirety.

TECHNICAL FIELD

The present disclosure relates generally to the field of processing an article for an end user and, more particularly, to systems and methods for inspections of articles.

BACKGROUND

The clothing and fashion industry has traditionally depended on a business model where customers purchase goods from physical retail locations. These goods are often discarded by the customer while the item is in good condition or even excellent condition. Numerous retail locations are necessary to attract customers and provide sufficient space for the display of items and to stock items of different styles, sizes, etc. These physical retail locations are operated by teams of employees and are both labor-intensive and expensive to maintain. Additionally, each physical location can only attract consumers within a narrow geographic area. It is also expensive and difficult to adapt multiple retail locations to rapidly-changing trends.

Although many industries have successfully migrated to Internet-connected platforms, the clothing industry largely remains dependent on physical retail stores and traditional business models. Even when a sale of clothing is performed over the Internet, the item may still be used infrequently by a single consumer before being discarded. Thus, the fashion and clothing industry also produces a significant amount of waste. Accordingly, there is a need to transition to more efficient practices.

Various challenges face retailers seeking to transition to alternate strategies that provide items for short-term or temporary use. One such challenge lies in managing inbound articles for inspection, maintenance, cleaning, research, or stocking, and accumulating useful data based on the result of each activity. Current rental services inspect items in a cursory manner, if inspection is performed at all. Even when a more detailed inspection is performed, data associated with the result of the inspection are not recorded. There is a need for systems and methods to inspect an article, such as an article of clothing, provided for multiple end users, and to evaluate information during and after the inspection. Furthermore, as vast amounts of information may be collected in numerous different categories, there is a need to for systems and method that facilitate data recordation. Thus, the present disclosure is directed to processing an article for an end user and, more particularly, to systems and methods for tracking and performing inspections for articles provided to multiple end users.

SUMMARY OF THE DISCLOSURE

According to certain aspects of the disclosure, systems and methods are disclosed to perform article inspections in an accurate, trackable, and repeatable manner.

In one aspect, a method of using an inspection processor may include receiving one or more articles at an inspection station, and identifying, by the inspection processor, one of the articles by reading a unique identifier associated with the one of the articles. The method may also include inspecting the article based on at least one quality criterion, and updating an article tracking system based on the result of the inspection and the identifier.

In another aspect, a method of inspecting an article using an inspection processor may include receiving one or more articles at an inspection station, identifying, by the inspection processor, one of the articles by reading an identifier associated with the one of the articles, and displaying, on a display, an image representative of the article to be inspected identified by reading the identifier. The method may also include inspecting the article based on at least one quality criterion, and updating an article tracking system based on the result of the inspection.

In another aspect, an inspection system may include an inspection processor configured to communicate with an article tracking system that stores information for a plurality of articles and a plurality of identifiers associated with corresponding articles of the plurality of articles. The inspection system may include a reading device configured to read the plurality of identifiers, wherein the inspection processor is configured to receive inspection information associated with at least one of the articles based on the identifier read by the reading device.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for article inspection and management.

As described above, there is a need in the field of article processing to more accurately inspect the condition of a large number of articles that are provided to one or more end users and to update a centralized archival of data pertaining to the articles and inspections thereof.

Figure 1:
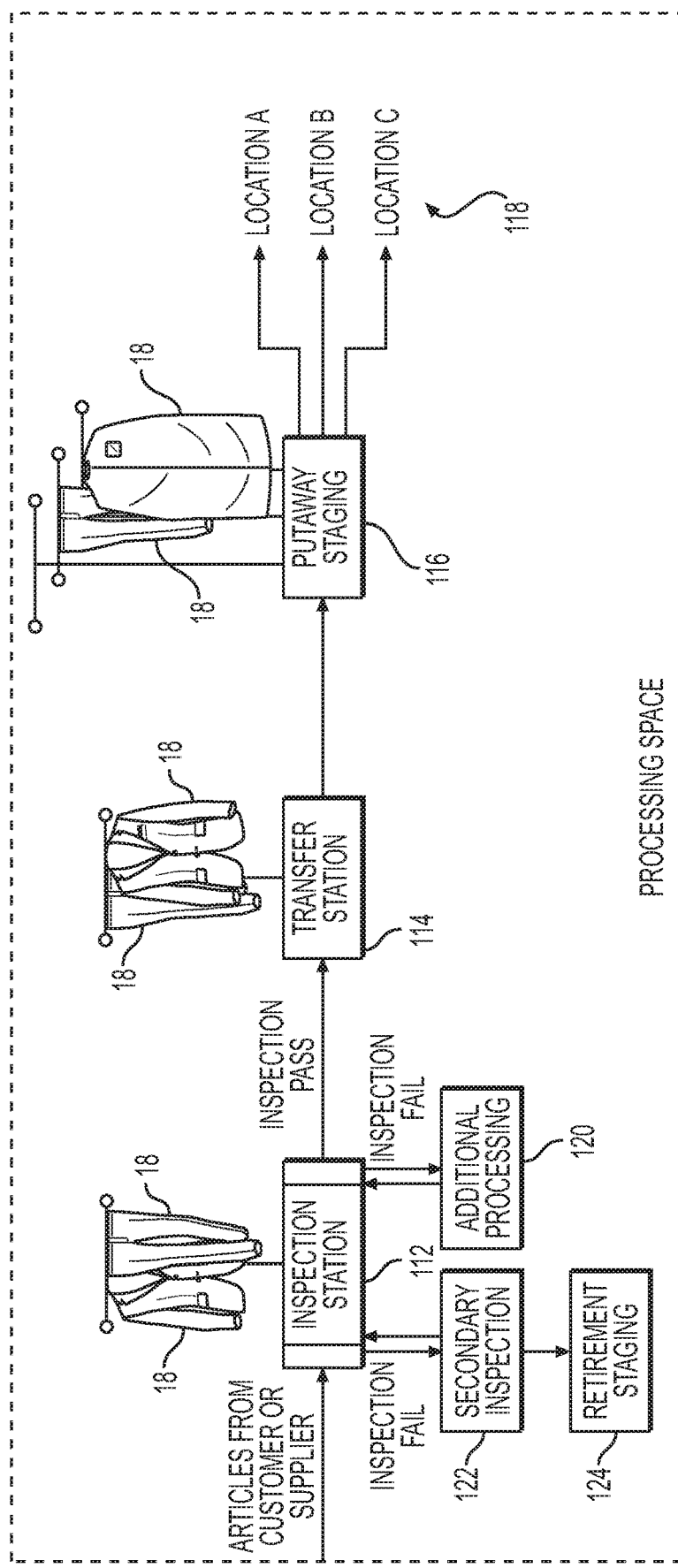
FIG. 1 is a schematic diagram of a workflow applicable to a service of providing articles including an inspection system according to an embodiment of the present disclosure.

FIG. 1 illustrates an exemplary workflow that may be applied to a service of providing articles to end users (e.g., clothing as a service). The articles are, for example, garments and accessories that are provided as a service to numerous users. As shown in FIG. 1, one or more articles 18 are received in a processing space 110 before being transferred to one or more destination locations 118 within the processing space 110. Processing space 110 may be, for example, an interior of a warehouse in which a number of articles 18 are received, cleaned, inspected, repaired, stored, and/or prepared for shipment to users. Each article 18 may be a new article received from a supplier (new arrival) or an article that was worn by a customer.

As shown in FIG. 1, in general, processing space 110 may comprise an inspection station 112, a transfer station 114, a putaway staging area 116, a retirement staging area 124, an additional processing area 120, a secondary inspection station 122, and a plurality of destination locations 118. Destination locations 118 may be locations within a single processing space 110 or within multiple processing spaces 110. Similarly, while inspection station 112, transfer station 114, and putaway staging area 116 may each be located within a single processing space 110, one or more of these may be located in various warehouses or processing spaces 110. While one inspection station is illustrated in FIG. 1, a plurality of inspection stations 112 may be provided within processing space 110 to increase productivity. Similarly, multiple transfer stations 114 and putaway staging areas 116 may be provided, and may be present in more or fewer locations than inspection stations 112.

In the operation of processing space 110, one or more articles 18 may be received in the processing space 110 to be transferred to one or more destination locations 118 within the processing space 110. Prior to being transferred to destination locations 118, each article 18 may be individually inspected at an inspection station 112. Depending on the result of the inspection performed at inspection station 112, the article 18 may be transferred to an additional processing area 120, secondary inspection station 122, a retirement staging area 124, or a transfer station 114. As can be seen in FIG. 1, articles 18 that pass inspection are relocated from inspection station 112 to a transfer station 114. From the transfer station 114, each article 18 may be subsequently transferred to putaway staging area 116. From putaway staging area 116, groups of articles 18 may be transferred to destination locations 118.

Figure 2:
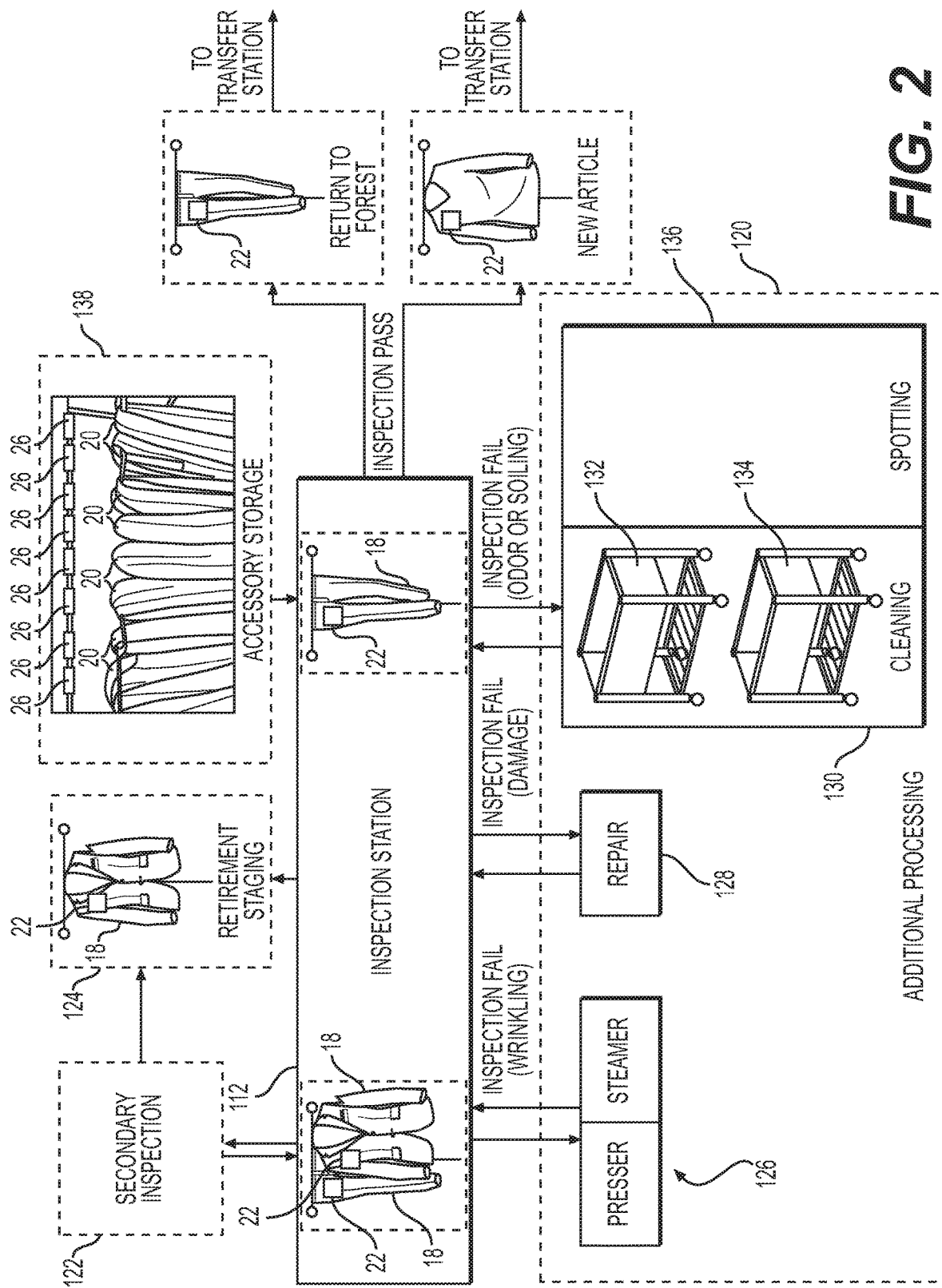
FIG. 2 is a schematic diagram illustrating a workflow for an inspection system and inspection process according to an embodiment of the present disclosure.

FIG. 2 illustrates a schematic diagram of inspection station 112 and an associated flow of articles 18. As can be seen in FIG. 1, one or more articles 18 can be delivered to an intake area divided into one or more lanes represented by the dashed box in the left portion of inspection station 112. Each article 18 is laundered and/or steamed prior to being staged at the intake area. Each article 18 is inspected in turn, preferably in the order in which the articles arrived (e.g., first in first out). Articles 18 that pass inspection may be staged in one or more lanes in an outbound area represented by the dashed box in the right portion of inspection station 112. From these outbound lanes, articles 18 that pass inspection may then be moved to transfer station 114 in groups. For example, new articles 18 that were received from a supplier are new to the inventory or "forest" of articles 18 may be staged in transfer station 114 separately from articles 18 received from customers and returning to the forest of articles 18.

In order to identify each article 18, a unique identifier 22 may be provided. Each article identifier 22 may be unique to a particular article 18. In one aspect, each identifier 22 may include encoded information indicative of an identity of the corresponding article 18, as well as providing a unique identifier for article 18.

Accessories 20 associated with one or more article 18 may be stored in accessory storage area 138. An accessory storage area 138 may be located in a vicinity of inspection station 112 to allow for identification of accessories 20 associated with a particular article 18. Each accessory 20 may be identified by an accessory identifier 26. In one example, accessory identifier 26 may be a portion of article identifier 22 (e.g., such as a portion of identifier 22 that indicates a style). Thus, accessory 20 may be readily placed with an associated article 18 following the inspection. Unlike article identifiers 22, accessory identifiers 26 may be the same for a group of identical accessories 20, without uniquely identifying each particular accessory 20.

Articles 18 that fail inspection but which are capable of being restored to new or like-new quality can be transferred to an additional processing area 120. Depending on the cause or type of the failure, the failed article 18 can be transferred to one or more of pressing/steaming station 126, repair station 128, cleaning station 130, or spotting station 136. Cleaning station 130 may receive articles 18 for dry cleaning in a dry cleaning cart 132 or for wet cleaning in a wet cleaning cart 134. Articles 18 may also be transferred between one or more of the pressing/steaming station 126, repair station 128, and cleaning station 130. Spotting station 136 may include equipment for performing steam and/or spotting agent treatment of a stained article 18. Preferably, articles 18 that require at least one of cleaning or steaming in addition to repair, are first transferred to repair station 128. Thus, if repair is not possible, the article 18 will not be unnecessarily cleaned or pressed.

Articles 18 that fail inspection and that cannot be restored to new or like-new quality may be transferred to a retirement staging area 124. Prior to being transferred to retirement staging area 124, articles that fail inspection may be transferred to secondary inspection area 122, where an additional inspection or audit may be performed. Articles 18 that fail the secondary inspection performed at secondary inspection area 122 may be transferred to retirement staging area 124. Articles that pass inspection at secondary inspection area 122 may be returned to inspection station 112, or may be transferred directly to transfer station 114. Articles 18 on which repair or cleaning is unsuccessful may be transferred to retirement staging area 124 directly from additional processing area 120. Articles 18 that are clearly irreparable may also be transferred directly to retirement staging area 124 from inspection station 112.

Figure 3:
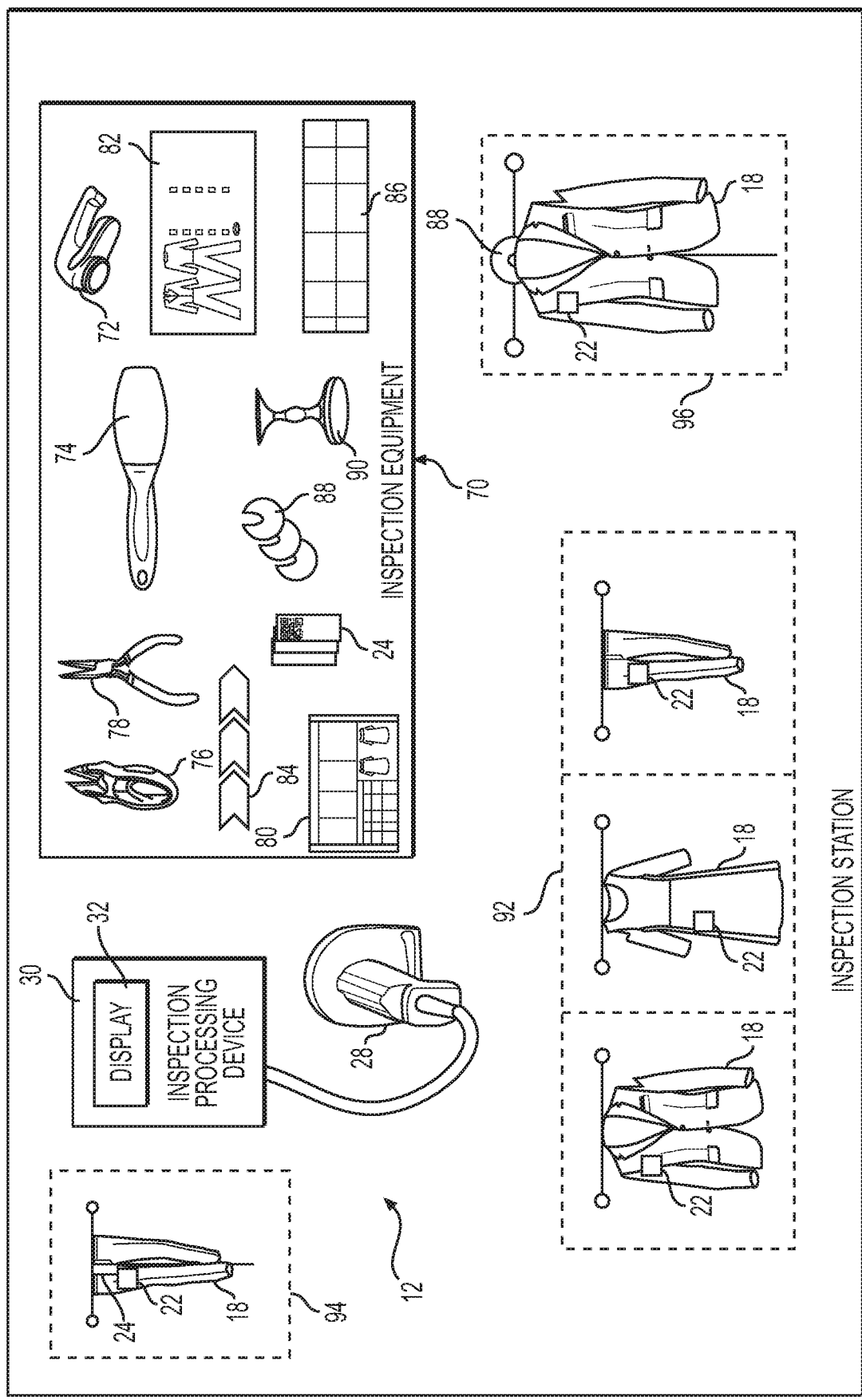
FIG. 3 is block diagram illustrating an inspection system including an inspection station, according to an embodiment of the present disclosure.

FIG. 3 is a block diagram illustrating an exemplary inspection station 112 within processing space 110. Inspection station 112 includes space(s) to organize articles 182 before or after inspection and includes equipment 70 necessary to perform inspection and minor repairs. An inspection system 12 may be provided within inspection station 112 to assist in the inspection and tracking of articles 18. Inspection system 12 may include, for example, article identifiers 22, inspector identifiers 24, an inspection processor or inspection processing device 30, a reader 28 that is capable of reading identifiers 22 and 24, and inspection equipment 70. Inspection system 112 may include a series of lanes 92, 94, and 96, for managing a flow of articles 18 in a controlled manner.

Articles 18 within a first lane 92 may be organized on one or more racks (e.g., Z-racks) to await inspection. Articles 18 in first lane 92 may be new arrivals received from a supplier, received from a customer (after being laundered), or a mix of the two. A second lane 94 may be provided for articles 18 that passed inspection. Third lane 96 may include one or more racks of articles 18 that failed inspection. Racks within third lane 96 may have dividers corresponding to a destination, such as repair station 128, retirement staging area 124, cleaning station 130, spotting station 136, or pressing/steaming station 126. If desired, portions or entire racks within lane 96 may also be used to place articles 18 that pass inspection, but require special care or an accessory 20. During inspection, an inspector gathers an item from a rack in first lane 92, performs an inspection using inspection system 12, and transfers the article to second lane 94 or third lane 96 based on the result of the inspection.

Inspection system 12 may include identifiers 22 and an inspection processing device 30 that is configured to read the article identifiers 22 with reader 28. Inspection processing device 30 may include a computer that is operatively connected to reader 28. Inspection processing device 30 may include a display 32. Display 32 may be an input/output (I/O) device including a touchscreen.

Each identifier 22 may represent (encode) various types of information that is deciphered by inspection processing device 30. For example, each identifier 22 may encode a source (e.g., brand, manufacturer), category (e.g., dress, pants, top, etc.), style (e.g., summer, fall, beachwear, etc.), color, size, and/or serial number (e.g., one or more numbers or letters that uniquely identify identical articles 18). Reader 28 may be a hand-held device configured to read identifiers 22, 24, and 26. For example, each of identifiers 22, 24, and 26 may be formed as a tag. As used herein a "tag" refers to at least one of a one-dimensional barcode, a two-dimensional barcode (e.g., a quick-response or "QR" code, FIG. 4), or a radio-frequency identifier such as an RFID tag, any of which may be read by reader 28. Alternatively, reader 28 may be affixed to or incorporated within inspection processing device 30. As used herein, "reading" contemplates at least one of scanning (e.g., by a detector that detects reflected light such as a laser), imaging (e.g., by a camera of a cellular phone), infrared communication, or radio-frequency communication. In one aspect, reader 28 may include a camera or other imaging device configured to image a one-dimensional or two-dimensional barcode. Reader 28 is able to output information corresponding to each unique article identifier 22 by reading or scanning identifier 22.

Figure 4:
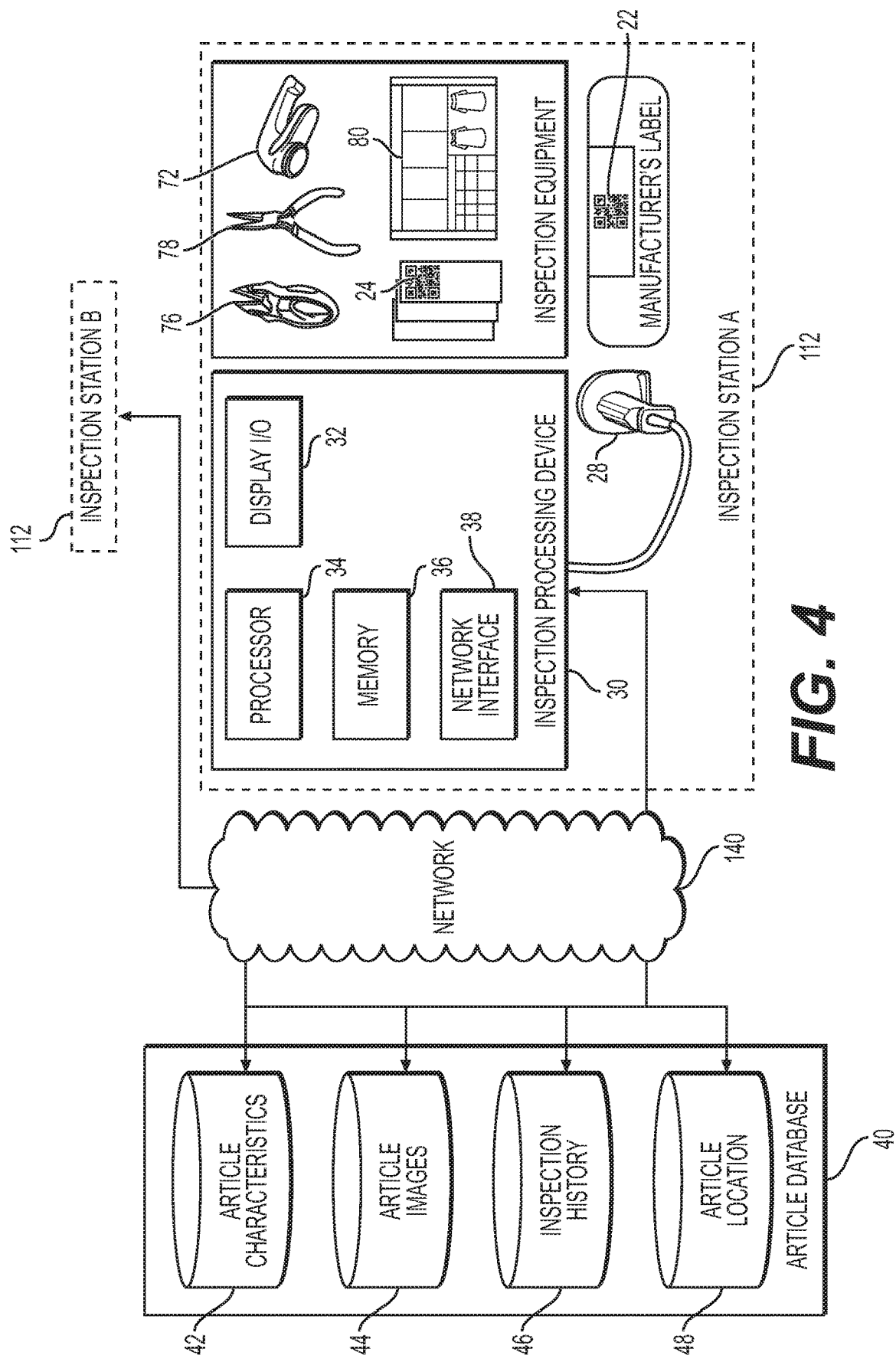
FIG. 4 is a block diagram illustrating an electronic network and environment including the inspection system of FIG. 3.

For ease of use, each identifier 22 may be physically attached to an interior of the corresponding article 18 (e.g., by fastening identifier 22 to an inside of a manufacturer's tag as shown in FIG. 4, or to a pocket on an interior of article 18). Thus, identifier 22 may remain fixed to article 18 during the life of the article 18, including when article 18 is worn by a customer, transported, laundered, etc. To ease understanding, identifier 22 is enlarged in FIG. 3. However, as shown in FIG. 4, identifier 22 may be provided in a size approximately the same as, or smaller than, a branding or care tag provided on article 18.

As noted above, inspection equipment 70 may be provided to facilitate the inspection of articles 18 and perform minor care or repairs during the inspection. Inspection equipment 70 may include inspector identifiers 24 that associate one or more articles 18 with a particular inspector that performed the inspection. Each inspector identifier 24 may include a tag or code that corresponds to the particular inspector. Inspection equipment 70 may also include a shaving device 72, lint brush 74, cutting tool 76, pliers 78, inspection tool 80, action tags 82, spot stickers 84, production worksheet 86, fail plates 88, and cashmere brush 90. Thus, an inspector may correct minor imperfections. In addition, inspection equipment 70 may include safety pins, a pen, and tickets for indicating where repair and spotting treatment is required.

FIG. 4 is a block diagram illustrating an article tracking system or article database 40 that may be used with inspection processing devices 30 in one or more inspection stations 112 (e.g., inspection station A and inspection station B). Article database 40 may be operatively connected, for example over network 140, with one or more inspection processing devices 30. In one aspect, network 140 may represent the Internet. However, network 140 may be a wired or wireless local network, or an intranet. Information stored in article database 40 is accessible by inspection processing device 30 via network 140, and may be added to, modified, or deleted by inspection processing device 30 following authentication.

As discussed above, inspection processing device 30 may include a computer. A memory 36 of processing device 30 may store instructions that, when executed by one or more processors 34, allow processing device 30 to operate as discussed herein. While display I/O or display 32 may be a touchscreen display, additional I/O devices such as a mouse or keyboard may also be included in display I/O 32. Inspection processing device 30 may include a wired or wireless network interface 38 configured to access article database 40 through a network 140.

Article database 40 may form an article tracking system that includes one or more storage devices that store article information. Each storage device of article database 40 may be formed by one or more hard disk drives, solid state drives, flash memory, USB storage devices, or other non-transitory storage media. Article database 40 may include an article characteristics storage device 42, article images storage device 44, inspection history storage device 46, and article location storage device 48. Although each storage device is illustrated as a part of database 40, one or more storage device may be combined and shared across one or more additional databases. Thus, when inspection stations 112 are located in processing spaces 110 of multiple warehouses, all of the information contained in article database 40 is readily accessed by each inspection processing device 30.

Whether article database 40 is connected to inspection processing device 30 by a global or local network 140, each inspection processing device 30 may access information stored in article characteristics storage 42, article images storage 44, inspection history storage 46, and article location storage 48. When reader 28 reads an identifier 22, information encoded in the identifier is output by reader 28 and received by processing device 30. This information may form the basis of a query sent from processing device 30 to article database 40. In response to the query, article database 40 outputs, via network 140, information from one or more of the categories of information associated with the identifier 22 that was read by reader 28. Thus, each article 18 may be identified in response to reading an identifier 22 by reader 28.

The information output from article database 40 may include article characteristics stored in storage 42. This information may include a source, category, style, color, size, etc. Article images storage 44 may include a photograph or stock image of the article 18. This image may represent an initial state of the article 18 when the article 18 is in new condition. Each image stored in image storage 44 may show an accessory 20 such as a belt, neckwear, etc., that is associated with the article 18.

Inspection history storage 46 may include a complete history for every inspection performed on each article 18. The history may be stored in a generalized form (e.g., general pass/fail information) or may be more granular. For example, the inspection history stored in storage 46 may include both broader categories of failure (see entries 60 in FIG. 5) and detailed causes of failure (see entries 62 in FIG. 5).

Location information of each article 18 may be stored in article location storage 48. This location information may specify a location of the article 18 within a particular processing space 110, a particular location within processing space 110 (e.g., awaiting an audit or second inspection at secondary inspection station 122), or may indicate that the article 18 is with a customer (e.g., by storing a unique user identification number associated with the customer). Thus, a detailed status of article 18 may be stored in article location storage 48.

Information stored by article database 40 may be updated by processing device 30 in response to the output of reader 28. For example, processing device 30 may update article location information of an article 18 in response to being read by reader 28, or in response to an outcome of an inspection. In one aspect, inspection history information in storage 46 may be updated based on an outcome of an inspection performed at inspection station 112. Inspection processing device 30 may determine the result of an inspection by guiding an inspector through a series of prompts and receiving an inspection result from reader 28 or other input device. The result of the inspection may then be used to update the inspection history information, article location information, and any other relevant information stored by article database 40. Additionally, the inspection history can be updated based on the identifier 22 read by reader 28 to ensure that the inspection result is correlated with the correct article 18.

Figure 5B:
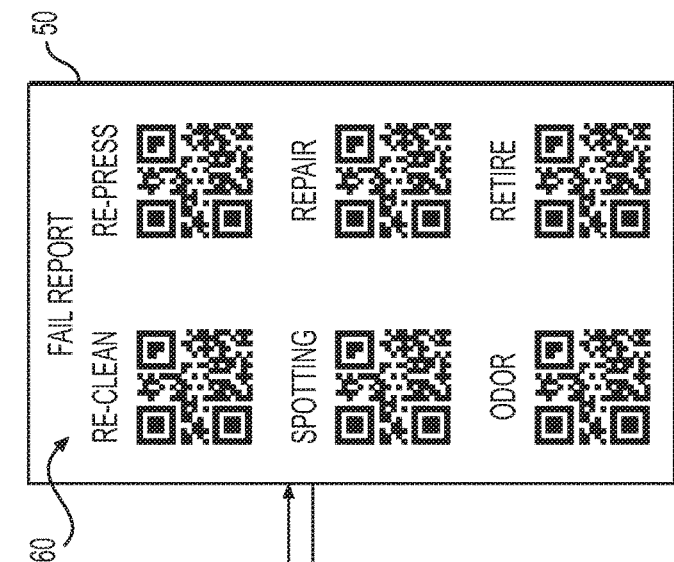
FIGS. 5A, 5B, and 5C illustrate a series of exemplary prompts presented on an electronic display by an inspection processing device, according to an embodiment of the present disclosure.
Figure 5A:
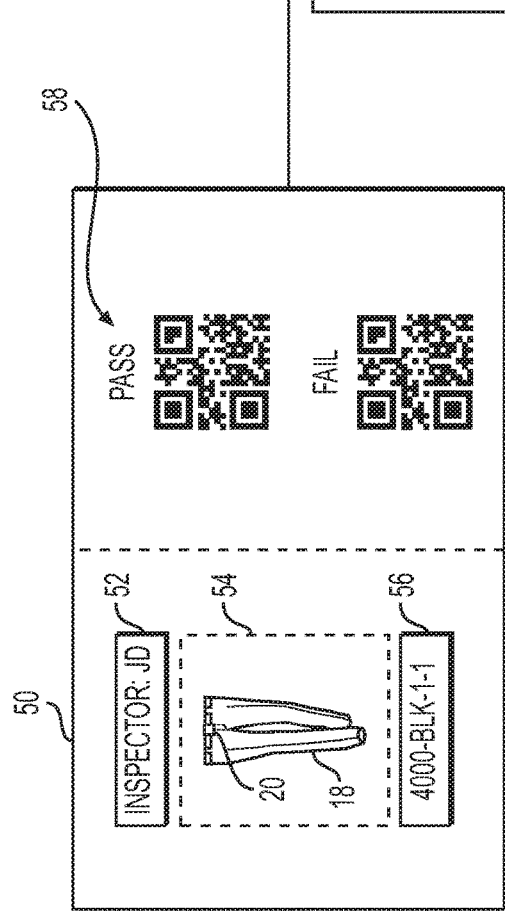
Figure 5C:
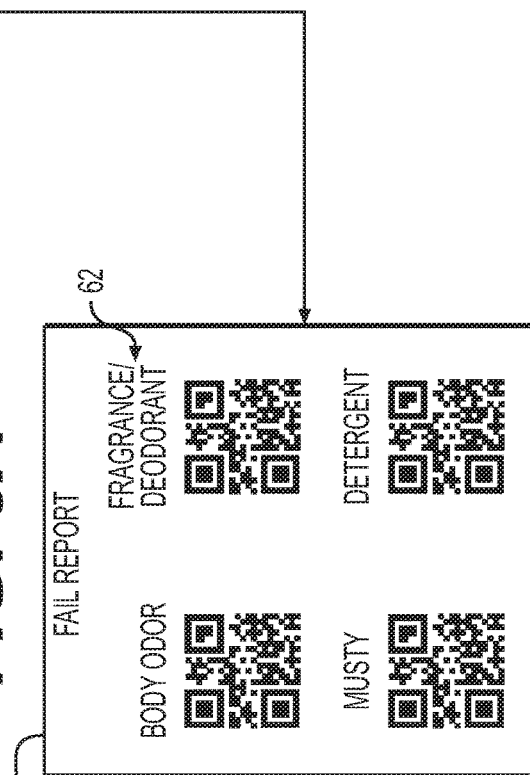

FIGS. 5A-5C illustrate an exemplary series of prompts that may be displayed by display 32 during an inspection process for an article 18. FIG. 5A illustrates an image 50 displayed on display 32 of processing device 30. As can be seen in a left-hand portion of FIG. 5A, an image 50 may include an inspector identification image 52, an image of an article 54 (e.g., provided to processing device 30 from image storage 44), and an image 56 representative of information encoded by article identifier 22. As shown in a right-hand portion of FIG. 5A, image 50 on display 32 may include one or more inspection result entries 58. These inspection result entries 58 may be either touchscreen objects (e.g., buttons) or tags (e.g., one-dimensional barcodes, two-dimensional barcodes, or other codes that can be read by reader 28), and may be entered by reading the desired entry with reader 28.

FIGS. 5B and 5C illustrate exemplary images 50 that may be displayed in response to a selection of entry 58. For example, when reader 28 reads the entry 58 associated with a failed inspection ("fail" in FIG. 5A), display 32 may display an image 50 as shown in FIG. 5B presenting one or more entries 60 corresponding to a category of failure (e.g. re-clean, spotting, odor, etc.) When reader 28 reads an entry 60 corresponding to a category of failure (e.g., "odor") inspection processing device 30 may display an image 50 with one or more causes of the failure entries 62 as shown in FIG. 5C. Entries 60 and 62 may also be provided as touchscreen objects or tags. Other formats may also be used for any of entries 58, 60, and 62. For example entries 58, 60, and 62 may be provided in a list of entries with corresponding check-boxes or radio buttons, drop-down lists, tables, cells in a spreadsheet, etc. Thus, in some examples, entries 58, 60, and 62 may be entered by a mouse or keyboard instead of by reader 28. Regardless of the form of entries 58, 60, 62, inspection processing device 30 may determine a category and a cause of a failed inspection for article 18, and update inspection history in storage 46 accordingly.

Figure 6:
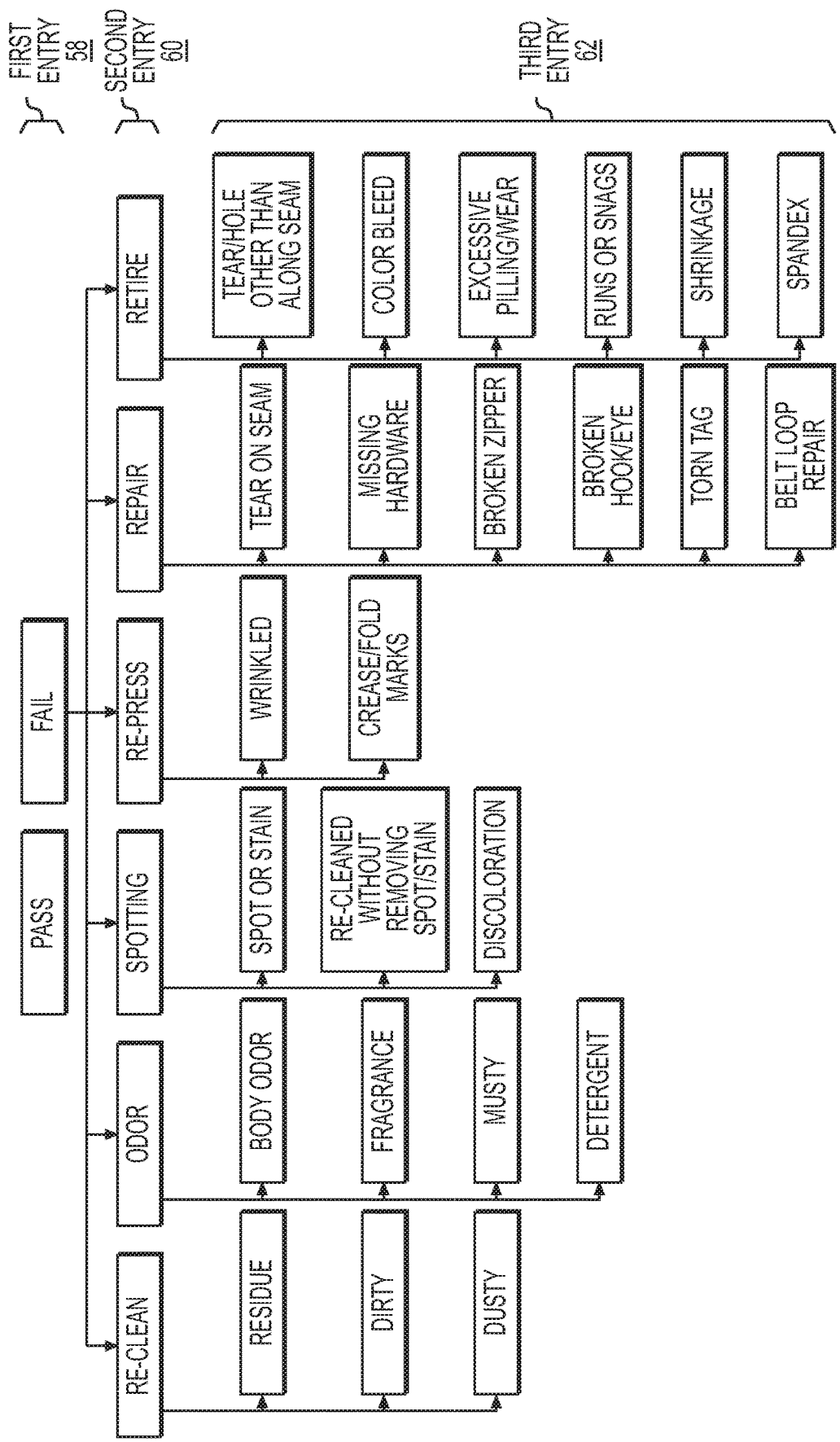
FIG. 6 is a chart illustrating a series of entries presented on the display by the inspection processing device according to an embodiment of the present disclosure.

FIG. 6 is a nested list representing exemplary inspection result entries or first entries 58, failure category entries or second entries 60, and failure cause entries or third entries 62 that may be displayed in image 50 on display 32. As shown in FIG. 6, first entry 58 may correspond to an inspection result (e.g., pass or fail). Second entry 60 may include each possible category of failure displayed based on the selected first entry 58, as can be seen in FIGS. 5B and 6. As shown in FIGS. 5C and 6, the third entry 62 may be one or more causes of failure corresponding to the selected second entry 60.

Figure 7:
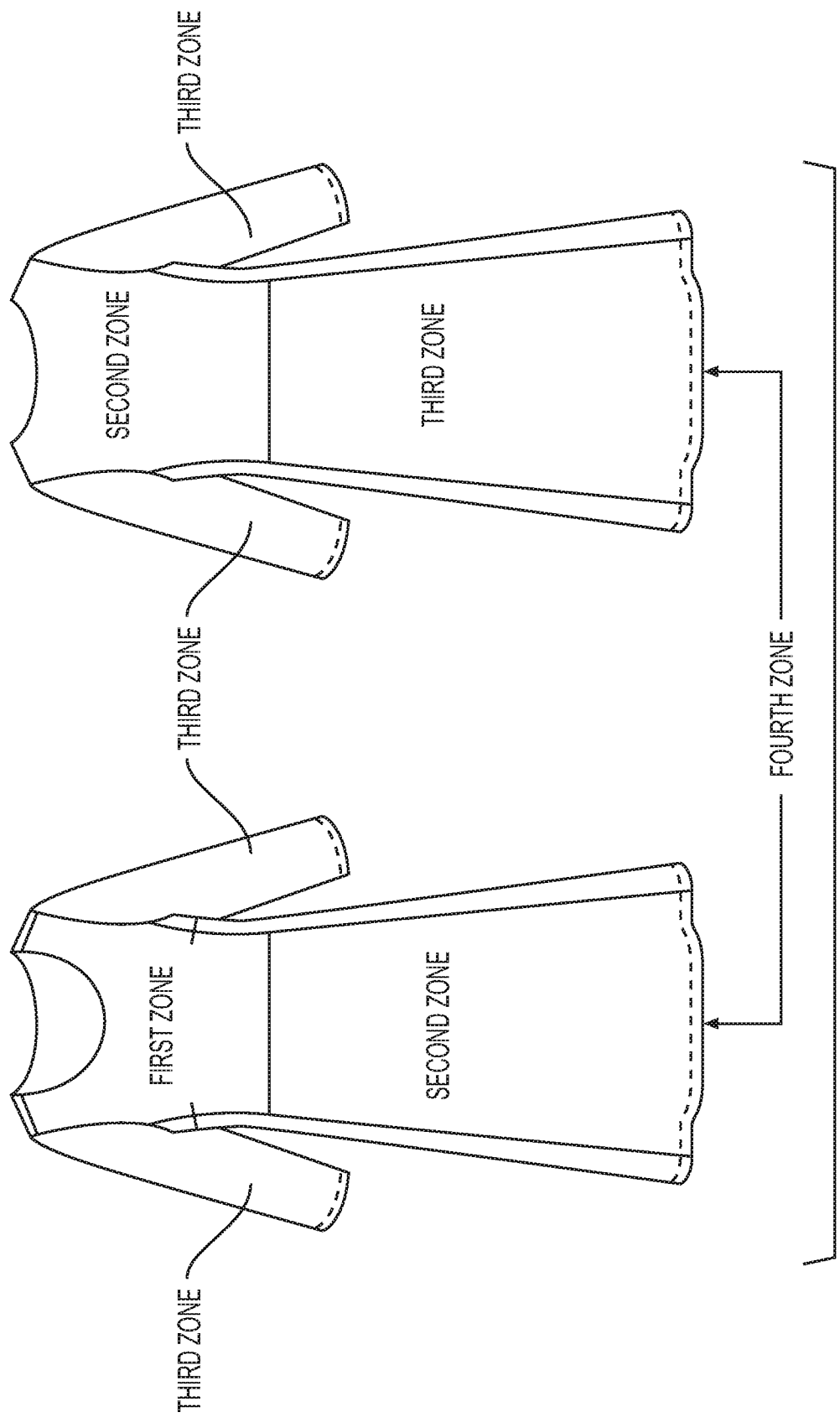
FIG. 7 is a diagram illustrating areas of inspection according to an embodiment of the present disclosure.

FIG. 7 is a diagram illustrating exemplary locations on each article 18 that may be evaluated during an inspection. As can be seen in FIG. 7, article 18 may be evaluated as a series of areas or zones (e.g., four zones). In one example, article 18 may be a garment evaluated with respect to: a first zone that corresponds to the front of the garment above the waist, a second zone that corresponds to the front of the garment below the waist, a third zone that includes the arms and a back of the garment below the waist, and a fourth zone that corresponds to an interior of the garment. Each zone may be evaluated in light of one or quality criteria such as: determining the presence of a stain, color bleeding, tearing, snagging, broken stitching, odor, dirt, wrinkling, shrinkage, wear, pilling, color fading, missing or broken hardware, or missing or broken embellishments. An inspection standard for determining when an article 18 has failed the inspection may differ based on the zone evaluated and the criterion. For example, while a snag may unacceptable in a front of the article (e.g., the first zone), minor snagging may be acceptable on an interior of the article (e.g., the fourth zone).

The zones shown in FIG. 7 are exemplary, and may not present in all articles. These zones may also differ based on the type of article being inspected. For example, when article 18 is a pair of pants, the first zone may be the front of the pants from the waistline to the knee. For some articles 18, such shorts, T-shirts, etc., fewer than four zones may be present. For other articles 18, such as shoes or suits, five or more zones may be present.

Figure 8:
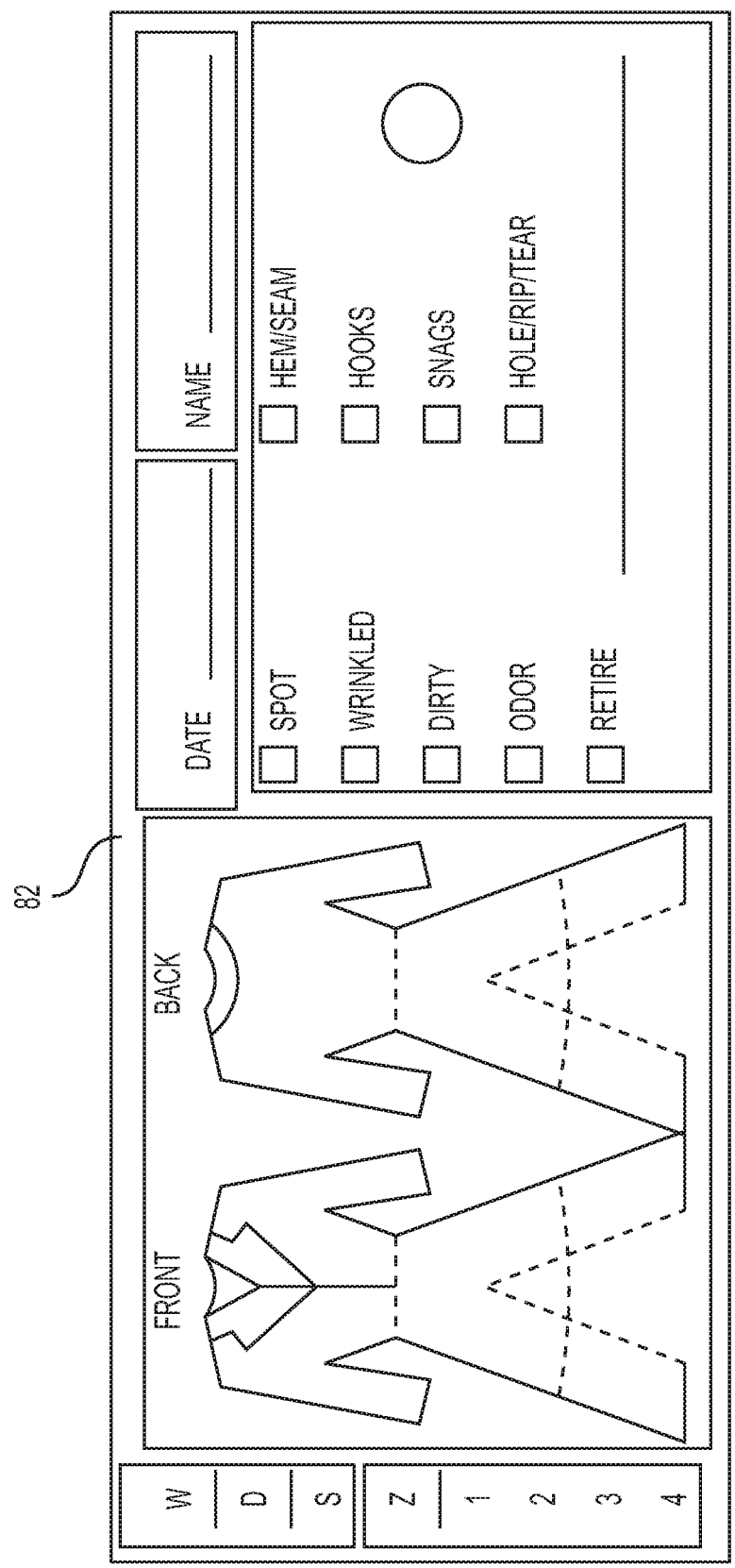
FIG. 8 is a view of an action tag according to an embodiment of the present disclosure.

FIG. 8 is an illustration of an action tag 82 that is completed and attached to an article 18 that has failed an inspection. Action tag 82 may include a care indication (e.g., "W" for wet laundering, "D" for dry laundering, or "S" for special care), a zone in which a cause for the failure is present (e.g., Z, or zone: 1, 2, 3, or 4), images of a front and back of an article, and a checklist of article failure categories. Thus, when article 18 is transferred to additional processing area 120, operators may readily identify the region of the article 18 needing attention or repair. Action tag 82 may also include a name of the inspector and a date of the inspection.

Figure 9:
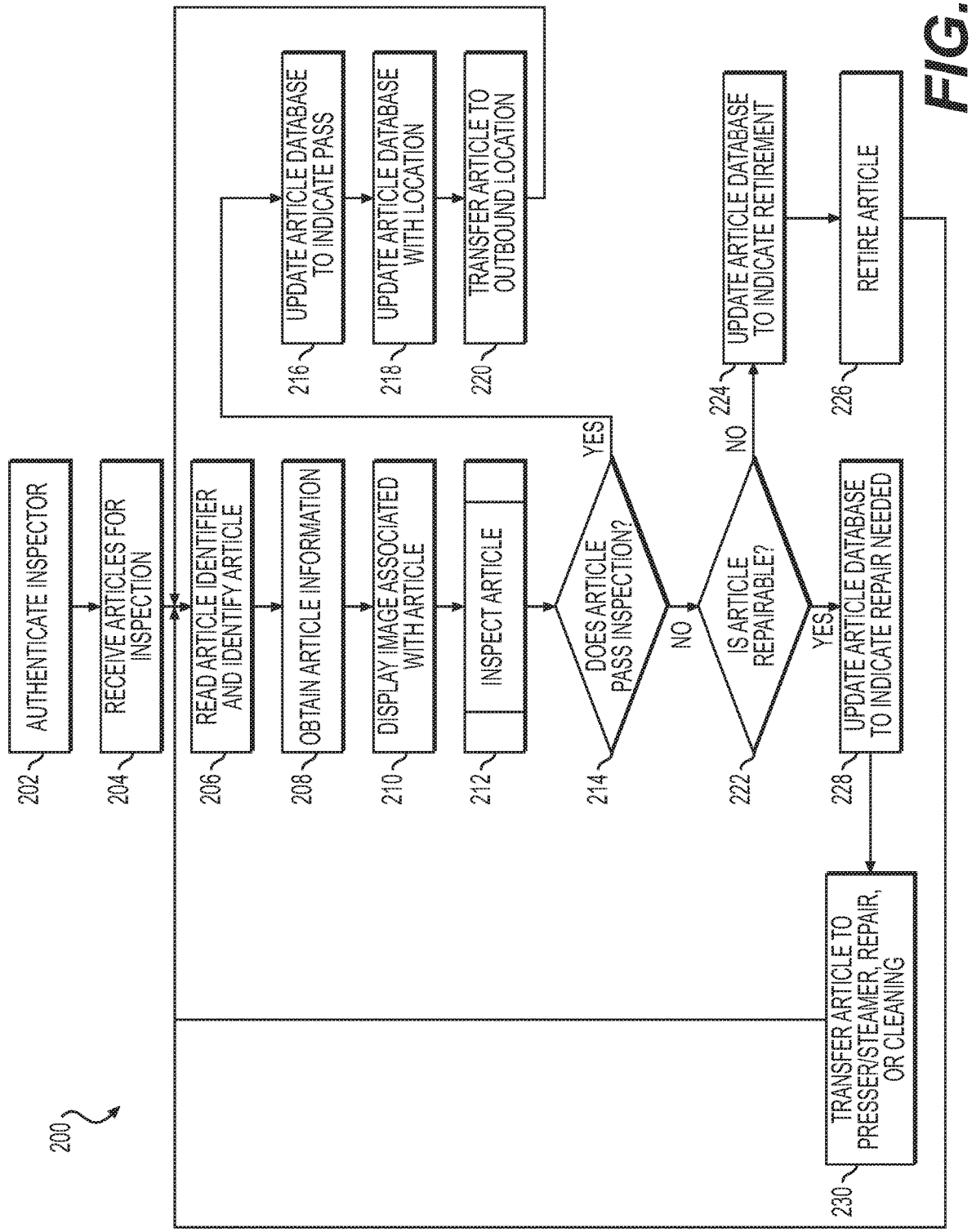
FIG. 9 is a flow diagram illustrating an inspection process according to an embodiment of the present disclosure.

FIG. 9 is a flowchart of a method 200 for using inspection system 12. In an initial step 202, inspection processing device 30 may authenticate an inspector using processing device 30. This may include presenting an authentication prompt (e.g., a prompt for a user identification and password) to authenticate an inspector to prevent unauthorized access or modification to article database 40. Authentication of an inspector during step 202 may include reading a tag associated with the inspector with reader 28. In response to identifying an authenticating an inspector, processing device 30 may display inspector identification image 52 on display 32, as shown in FIG. 5A. Also, once the inspector is authenticated, display 32 may provide multiple windows or a window separated into one or more tabs. A first tab may include an inspector identification image 52. A second tab may allow an inspector to indicate that an article failed inspection and is to be transferred to cleaning station 130 or to spotting station 136.

In a step 204, one or more articles 18 are received for inspection. At this time, an inspector identifier 24 may be placed on a rack in second lane 94. These articles 18 may be received in a first lane 92 (FIG. 3) of an inspection station 112. Upon being received in inspection station 112, each article 18 may have a unique identifier 22 attached thereto.

In step 206, reader 28 may read identifier 22 associated with a particular article 18. Reader 28 reads information encoded by identifier 22, for example an alpha-numeric string of characters, and outputs this information to processing device 30. Based on this information, processing device 30 may have sufficient information to identify the article 18. For example, the information from reader 28 may uniquely identify article 18. Also, the information from reader 28 may allow processing device 30 to determine article characteristics that are stored locally within memory 36 such as one or more of a source, category, style, color, size, or serial number.

In step 208, based on the identifier 22 read by reader 28, processing device 30 may query article database 40. Article database 40 responds, for example via network 140, with one or more of: article characteristic information, article image information, article inspection history information, or article location information from storage devices 42, 44, 46, and 48. Additionally, while the article 18 may be identified during step 206, it is also contemplated that the article 18 is identified at least in part in step 208 based on information received from database 40. For example, when memory 36 of processing device 30 does not contain article characteristics information, this information may be received from database 40.

In a step 210, processing device 30 may cause display 32 to display an image 54 of the article 18, as shown in FIG. 5A. This article image 54 may be an image of the article 18 in a new or like-new condition. The article image 54 allows an inspector to readily determine whether an incorrect identifier 22 is attached to and/or associated with the article being inspected. The article image 54 may also assist the inspector in evaluating a degree of color fading and/or color bleeding in article 18.

For articles 18 that include an accessory 20, such as a belt, the image 50 displayed in step 210 may include a depiction of the accessory 20, providing a visual cue to the inspector to ensure that the accessory 20 is provided with article 18. For example, as shown in FIG. 5A, the image of accessory 20 may be included with the article image 54. The image of accessory 20 associated with article 18 may be provided in a separate portion of the image or in a separate window or tab. When article 18 is a garment, accessory 20 may be a belt, camisole, scarf, or other accessory.

Figure 10:
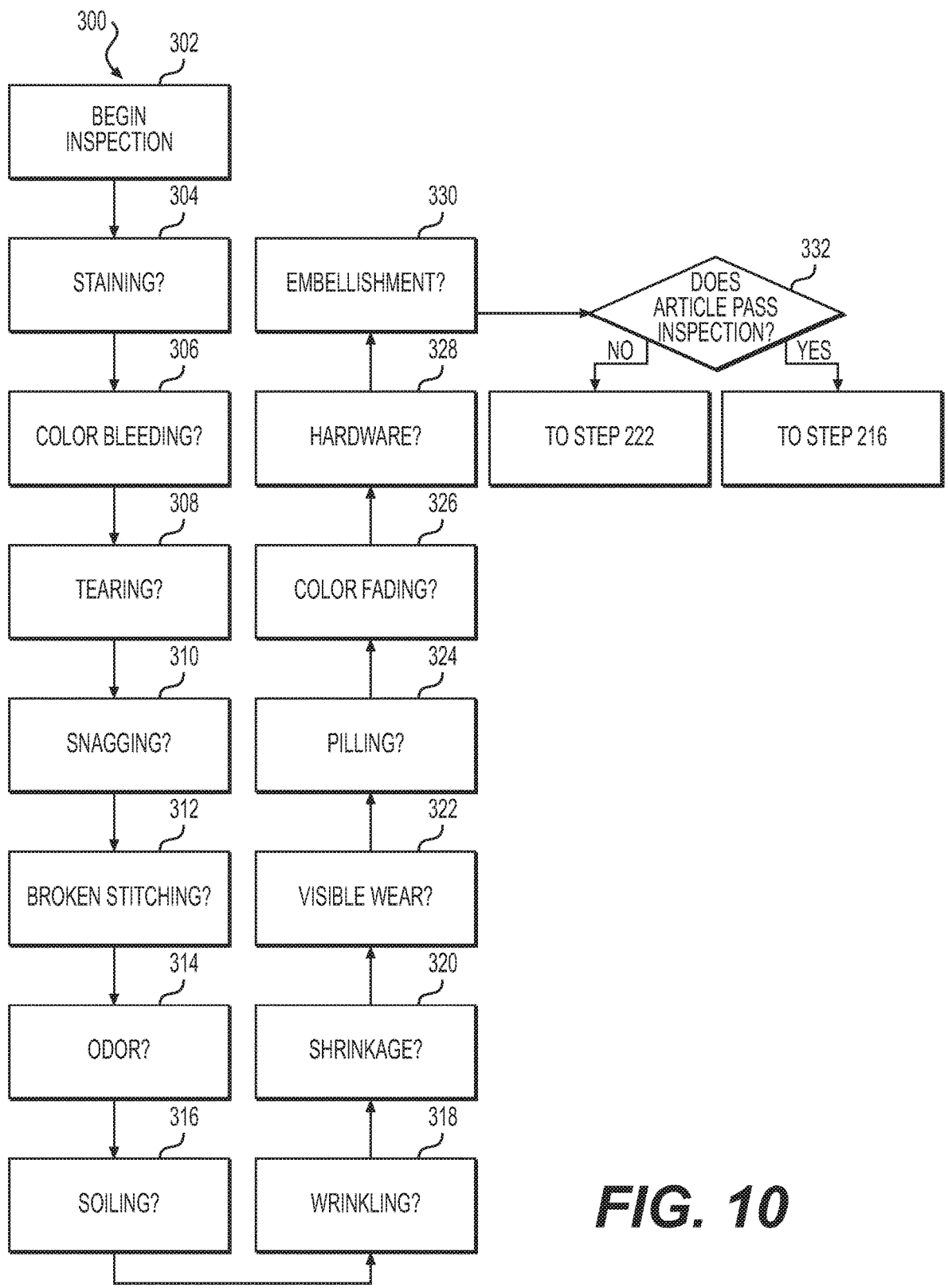
FIG. 10 is a flow diagram illustrating a multi-point inspection pass/fail process according to an embodiment of the present disclosure.

In step 212, the inspector performs an inspection of each zone of the article 18 based on at least one quality criterion (or point of inspection). An exemplary process for performing step 212 is shown in FIG. 10 and described below.

In a step 214, when an article 18 passes inspection, the corresponding inspection result entry 58 ("Pass") may be read and entered. This may be performed by reading inspection result entry 58 with reader 28. Entry 58 may be an image, a touchscreen element, or a physical tag. Alternatively, inspection result entry 58 may be entered via an input/output device such as a touchscreen display included in display 32, or a mouse and keyboard. When an article does not pass inspection, the corresponding inspection result entry 58 ("Fail") may be entered in a similar manner. Based on the result of the inspection, method 200 proceeds from step 214 to either step 216 (when the article 18 passes inspection) or step 222 (when the article 18 fails inspection).

In step 216, following a passed inspection, inspection history storage 46 of article database 40 may be updated to reflect the passed inspection. This may be performed by inputting the inspection result entry 58 (FIG. 5A) for a passed inspection.

Thus, inspection database 40 may be updated in response to entry 58 read by reader 28.

In step 218, processing device 30 may update a corresponding location within location storage 48. This may also be performed in response to reading inspection result entry 58 with reader 28. This location may be a general location, for example an indication that the article 18 is in need of transfer and should be transported to transfer station 114. A specific location, such as a location within a warehouse, may be used instead of a general location.

In step 220, the article that passed the inspection in step 214 is transferred to new location or destination. For example, each article 18 may be placed on a rack in second lane 94 containing one or more inspector identifiers 24. Step 220 may include transferring one or more of the inspected articles 18 from second lane 94 of inspection station 114 to a putaway staging area 116. When filled racks within lane 94 are transferred to transfer station 114, an identifier 24 corresponding to the inspector may be provided to a transfer operator at transfer station 114. These identifiers 24 may also be tags that are readable by reader 28. Step 220 may include transferring one or more articles 18 to one or more destination locations 118. Method 200 may then return to step 206 for processing and inspection of additional articles 18.

When, during step 214, entry 58 indicating a failed inspection is input, a determination step 222 may be performed. In one aspect, during step 222, processing device 30 may display one or more categories of failure entries 60 on display 32, as shown in FIG. 5B. One of the categories of failure entries 60 may correspond to failures that are clearly irreparable, such as large tears. Thus, a category of failure such as "Retire," may be entered, for example by reading the corresponding tag with reader 28. In one aspect, "Retire" may be entered based on the type of failure of the article 18 (e.g., shrinkage) to permanently remove the article 18 from circulation. If repair is determined to be possible in step 222, a category of failure entries 60 other than "Retire" may be read with reader 28. In such a case, based on the type of failure of the article 18, the article 18 may be temporarily removed from circulation. In the example shown in FIG. 5B, "Odor" is selected as the category of failure entries 60.

In order to determine a location at which repair will be performed and a specific cause for the failed inspection, step 222 may include entering one or more causes of failure entries 62 for articles 18 that fail inspection and determining if repair is possible. Thus, processing device 30 may determine a specific cause of failure for each article 18 and update inspection history storage 46 accordingly.

For one or more of the category or cause of failure entries 60, 62, a maximum number of failures may be permitted during the life of an individual article 18. For example, each article 18 may be allowed to fail for odor three times or fewer. Thus, step 222 may include determining whether a number of repairs or treatments is greater than a predetermined threshold number ("n"). For example, processing device 30 may determine, based on the inspection history from storage 46, whether an article identified as failing for odor has been previously identified as failing for odor more than three times, as reflected in the inspection history stored in storage 46. When processing device 30 determines that the repair count is equal to n (e.g., a repair count of three), display 32 may display this information to the inspector. Such articles may be considered "last chance garments" that are retired in the event that laundering or cleaning does not remedy the failure. Last chance garments may be placed in a designated area or otherwise identified on a rack in third lane 96. Method 200 may then continue to step 228, described below, for the last chance garment. When processing device 30 determines that the repair count exceeds n (e.g., a fail count of four for odor), display 32 may display an instruction to the inspector that the article 18 is to be retired, and method 200 proceeds to step 224.

When the determination in step 222 is negative, or for articles that have exceeded threshold number n of permitted failures, step 224 may be performed. In step 224, processing device 30 updates article database 40 to indicate the retirement of the article 18, which may be a retirement that permanently removes article 18 from circulation. Step 224 may be performed by updating the entry in each storage 42, 44, 46, and 48, or by deleting each entry corresponding to the retired article 18. Thus, article database 40 may retain accurate records for each article 18 in circulation, regardless of the particular location of the article 18.

Following or concurrently with step 224, in step 226, the article 18 is transferred to an appropriate location, such as retirement staging area 124 or an appropriate location within third lane 96. Additionally, an action tag 82 may be completed and physically attached to the article 18. Such articles 18 may be returned to the manufacturer (particularly in the event that new arrival articles fail inspection), donated, or otherwise removed from circulation. Method 200 may then return to step 206 and additional articles 18 are processed. When an article is determined to be irreparable, the inspector may place the failed garment on a predetermined rack or portion of a rack in lane 96. These articles 18 may be brought to retirement staging area 124, audited, and subsequently removed from circulation. If desired, step 224 may be performed as a part of, or following, an audit performed as part of step 226. Method 200 may then return to step 206 for processing and inspection of additional articles 18.

When the result of step 222 is affirmative (the article is repairable), step 228 may be performed. In step 228, article database 40 may be updated in a manner similar to step 218. For example, the inspection history stored in storage 46 may be updated to include the inspection result 58 ("fail"), the category(ies) of failure entries 60, and/or the cause(s) of failure 62. In order to capture all of the information of the inspection performed in step 212, multiple categories of failure entries 60 and/or causes of failure 62 may be entered. The location of the article 18 may also be updated in location storage 48. This updated location may be a general location, such as "Additional processing check-in," or more specific locations such as "Cleaning check-in," "Spotting check-in," "Repair check-in," or "Pressing/steaming check-in." The updated location of article 18 may also be a specific location within a warehouse, for example an aisle identifier and/or a shelf identifier. Additionally, processing device 30 may update article characteristics storage 42 and/or inspection history storage 46 with the repair(s) performed to remedy the failure.

Method 200 may proceed to step 230 in which the article 18 is transferred for additional processing. This may be performed by placing the article 18 on an appropriate location on a rack in third lane 96. Specifically, article 18 may be placed on a rack, or a portion on a rack, that corresponds to the destination of the article 18 (e.g., pressing/steaming station 126, repair station 128, cleaning station 130, or spotting station 136). The use of racks in step 230 is merely exemplary, and other transportation or staging may be used. For example, for articles 18 that are awaiting transferred for cleaning, dry cleaning cart 132, wet cleaning cart 134, or a special care cart may be used to transfer articles 18 and may be provided in addition to racks within third lane 96. Step 230 may also include completing an action tag 82 and physically attaching the action tag 82 to the article 18. However, for articles requiring special care (e.g., leather), the use of an action tag 82 may be omitted. Additionally, spot stickers 84 may be applied to the article 18 to indicate areas in which repair (e.g., spot treating or seam repair) is necessary. At the conclusion of step 230 method 200 may return to step 206.

FIG. 10 is a flowchart of a method 300 of evaluating an article 18 using an inspection system 12. Method 300 may be performed as a part of method 200. For example, each of the steps 302 to 330 of method 300 may be performed as part of step 212 of method 200 (see FIG. 9).

In a first step 302 of method 300, an inspection of an article 18 may begin. This inspection may include evaluating an article 18 for various defects in an objective, systematic manner. Each of the defects (e.g., the defects discussed below with respect to steps 304 to 330) may be compared to an objective standard. One or more of these objective standards may be measured by using inspection tool 80. Steps 304 to 330 each corresponds to one point of inspection. Thus, in the example of method 300, twelve points of inspection are performed. However, the inspection may include fewer than twelve points or more than twelve points, as necessary or desired. While the inspection may be immediately terminated when an article 18 fails one of the inspection points, particularly if the failure is irreparable, it may be preferable to perform the entire inspection even in the event that the article 18 fails one or more of the inspection points.

Thus, article 18 may be transferred properly and the inspection history may be updated with complete inspection data. For example, by performing all of the steps associated with inspection points, an article may be repaired properly (e.g., by repairing a hole prior to dry cleaning to ensure that the hole may be repaired). Steps 304 to 330 may be performed in any order, may be performed partially or entirely concurrently, or may be performed sequentially.

In step 304, the article 18 is inspected for the presence of stains and/or spots. When a stain is present, an action tag 82 and/or spot stickers 84 may be used to indicate the location of the stain. In step 306 the article 18 may be inspected for color bleeding. The standard for determining a failed inspection for staining and/or color bleeding may be zone-dependent. For example, a small stain may be acceptable in the fourth zone (FIG. 7), while no staining is allowed in any of the remaining zones. In steps 308, 310, and 312, the physical integrity of the article may be inspected. For example, steps 308, 310, and 312 may include inspecting for tearing (holes or rips), snagging, and broken stitching, respectively. Inspecting for broken stitching in step 312 may include inspecting for alterations to seams or hems, loose threads, etc. Steps 308, 310, and 312 may include focusing on certain areas of garments of particular types. For example, tops, dresses, or jackets, these steps may include focusing on shoulder, armhole, sleeve, underarm, and side seams, as well as the collar and neck, manufacturer's tag, sleeve cuffs, and bottom hem. For pants, steps 308, 310, and 312 may include focusing on the side, bottom, and inner thigh stitching, waist, belt loops, pockets, hardware, embellishments, and manufacturer's tag.

Steps 314, 316, 318, and 320 may involve inspecting the article 18 for defects associated with the laundering process performed prior to the inspection. For example, these steps may include inspecting for odor, soiling, wrinkling, and shrinkage, respectively. Step 314 may be performed by performing a smell test on one or more areas of article 18 such as where sleeves join zone 1, as well as a central portion of zone 1. An article may fail inspection at step 314 when body odor, musty smells, cigarette smells, or strong fragrances are detected by the inspector. Step 316 may include determining the presence of dirt, food remnants, etc. Step 318 may include evaluating the article for unintentional lines or folds in the fabric of the article 18. Step 320 may include determining whether a portion or entirety of article 18 has become noticeably smaller.

Steps 322, 324, 326, 328, and 330 may involve inspecting article 18 for issues associated with repeated use of an article 18, including wear and damage. Specifically steps 322 and 324 may include inspecting article 18 for visible wear (damage or shabby appearance) and pilling. Pilling may occur when small bits of material are present on a fabric surface of the article. In step 326, it is determined whether the freshness, or brilliance of color in the article 18 has been lost. In order to assist an inspector in making this determination, processing device 30 may cause display 32 to display an image 54 of the article 18 in a new condition, illustrating the appearance of the article with no or negligible fading. In step 328, the hardware of the article 18, including any closures (e.g., zippers, buttons, snaps, hooks, and eyes) is inspected for functionality and appearance. Similarly, in step 330, decorative details such as sequins, beads, stones, and studs are inspected.

Following the performance of steps 304 to 330, it is determined whether the inspected article 18 passed every point of inspection in step 332. When the determination in step 332 is affirmative, the inspected article 18 is either new or in like-new condition and steps 222 (FIG. 9) is performed. If the determination in step 332 is negative, the inspected article 18 failed at least one point of inspection and step 216 (FIG. 9) is performed.

Each of the inspection points of steps 304 to 330 may include one or more corresponding category of failure entries 60 and/or cause of failure entries 62. Thus, by reading the appropriate code or tag with reader 28, a result of each point of inspection may be used to update the inspection history of a particular article. Further, by entering multiple categories or causes of failure entries 60, 62, the stored inspection history can contain a record of each inspection failure.

By providing detailed information regarding the outcome of an inspection, processing system 30 may allow an inspector to quickly and accurately contribute to the inspection history of an article. Additionally, as article database 40 includes article characteristics storage 42, which may identify a particular item from a manufacturer (e.g., an item with a particular stock keeping unit or "SKU"), inspection data from corresponding articles 18 may be correlated. Similarly, inspection history information may be known for a particular brand, size, color, or a combination thereof. Thus, inspection system 12 may develop a granular historical data which may inform the acquisition of articles 18 in the future. For example, if a particular manufacturer produces a popular and durable article 18, similar articles 18 from that manufacturer may be acquired. In an opposing example, an article 18 that has average or below-average popularity but which frequently fails inspections due to irreparable color fading or shrinkage may be acquired infrequently or not at all.

What is claimed is:

1. A method of inspecting and transferring articles using an inspection processor, the method comprising:
   receiving one or more articles at an inspection station comprising the inspection processor;
   identifying, by the inspection processor, one of the one or more articles by reading an identifier associated with the one of the one or more articles received at the inspection station;
   inspecting the identified article based on at least one quality criterion;
   updating an article tracking system in communication with the inspection processor based on the identifier of the inspected article and the result of the inspection, wherein the article tracking system maintains an inspection history including a failure history of the at least one quality criterion for the identified article;
   comparing, by the inspection processor, the failure history of the at least one quality criterion for the identified article to a predetermined threshold of failure; and
   transferring the identified article to a second location using a dry cleaning cart, a wet cleaning cart, or a special care cart based on a result of the comparison of the failure history of the at least one quality criterion for the identified article to the predetermined threshold of failure.

2. The method of claim 1, wherein the at least one quality criterion for the identified article includes at least one of: determining a presence of a stain, an odor, color bleeding, tearing, snagging, broken stitching, dirt, wrinkling, shrinkage, wear, pilling, color fading, missing or broken hardware, or missing or broken embellishments.

3. The method of claim 1, wherein the inspecting the identified article includes evaluating the at least one quality criterion for the identified article based on an area of the identified article.

4. The method of claim 1, wherein the identifier of the inspected article encodes at least one of a source, a category, a style, a color, a size, or a serial number of the inspected article.

5. The method of claim 1, wherein the article is a garment or an accessory for a garment.

6. The method of claim 1, wherein the second location includes at least one of an additional processing area, a secondary inspection station, a retirement staging area, or a transfer station.

7. The method of claim 1, wherein the inspection history is updated in response to reading a tag associated with the inspected article by a reading device or interacting with a touchscreen object that corresponds to the inspection.

8. A method of inspecting and transferring articles using an inspection processor, the method comprising:
- receiving one or more articles at an inspection station comprising the inspection processor;
- identifying, by the inspection processor, one of the one or more articles by reading an identifier associated with the one of the one or more articles received at the inspection station;
- displaying, on a display, an image representative of the identified article;
- inspecting the identified article based on at least one quality criterion;
- updating an article tracking system in communication with the inspection processor based on the identifier of the inspected article and the result of the inspection, wherein the article tracking system maintains an inspection history including a failure history of the at least one quality criterion for the identified article;
- comparing, by the inspection processor, the failure history of the at least one quality criterion for the identified article to a predetermined threshold of failure; and
- transferring the identified article to a second location using a dry cleaning cart, a wet cleaning cart, or a special care cart based on a result of the comparison of the failure history of the at least one quality criterion for the identified article to the predetermined threshold of failure.

9. The method of claim 8, wherein the at least one quality criterion for the identified article includes at least one of: determining the presence of a stain, an odor, color bleeding, tearing, snagging, broken stitching, dirt, wrinkling, shrinkage, wear, pilling, color fading, missing or broken hardware, or missing or broken embellishments.

10. The method of claim 8, wherein the inspecting the identified article includes evaluating the at least one quality criterion for the identified article based on an area of the identified article.

11. The method of claim 8, wherein the identifier of the inspected article encodes at least one of a source, a category, a style, a color, a size, or a serial number of the inspected article.

12. The method of claim 8, wherein the article is a garment or an accessory for a garment.

13. The method of claim 8, wherein the second location includes at least one of an additional processing area, a secondary inspection station, a retirement staging area, or a transfer station.

14. The method of claim 8, wherein the identifier is unique to the identified article and includes a tag having a one-dimensional barcode or a two-dimensional barcode.

15. The method of claim 14, wherein the tag is displayed on the display by the inspection processor.

16. The method of claim 8, further including determining that the identified article is associated with an accessory, and displaying the accessory in the image representative.

17. An inspection system, comprising:
- an inspection processor configured to communicate with an article tracking system that stores information for a plurality of articles;
- a plurality of identifiers associated with corresponding articles of the plurality of articles;
- wherein the inspection processor is configured to:
- receive article information associated with an article of the plurality of articles by identifying the article of the plurality of articles based on information encoded in an identifier associated with the article of the plurality of articles, wherein the article information is provided by the article tracking system to the inspection processor;
- receive a failure history from the article tracking system, the failure history being included in an inspection history for the identified article stored in the article tracking system; and
- determine when the failure history of at least one quality criterion for the identified article is equal to or greater than a predetermined threshold of failure; and
- a dry cleaning cart, a wet cleaning cart, or a special care cart configured to transfer the identified article to a second location based on the determined failure history.

18. The inspection system of claim 17, wherein the inspection processor is configured to transmit an update for the inspection history to the article tracking system based on an inspection result.

19. The inspection system of claim 17, wherein the at least one quality criterion for the identified article includes at least one of: determining the presence of a stain, an odor, color bleeding, tearing, snagging, broken stitching, dirt, wrinkling, shrinkage, wear, pilling, color fading, missing or broken hardware, or missing or broken embellishments.

20. The inspection system of claim 17, wherein the article is a garment or an accessory for a garment.

* * * * *